US012572640B2

(12) United States Patent
Albero et al.

(10) Patent No.: US 12,572,640 B2
(45) Date of Patent: Mar. 10, 2026

(54) SYSTEM FOR VALIDATION AND AUTHENTICATION OF RESOURCES IN A VIRTUAL ENVIRONMENT

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

(21) Appl. No.: 18/119,168

(22) Filed: Mar. 8, 2023

(65) Prior Publication Data
US 2024/0303316 A1    Sep. 12, 2024

(51) Int. Cl.
G06F 21/00        (2013.01)
G06F 9/50         (2006.01)
G06F 21/44        (2013.01)

(52) U.S. Cl.
CPC ............ G06F 21/44 (2013.01); G06F 9/5077 (2013.01)

(58) Field of Classification Search
CPC .............................. G06F 21/44; G06F 9/5077
See application file for complete search history.

(56) References Cited

U.S. PATENT DOCUMENTS

| | | | |
|---|---|---|---|
| 7,984,304 B1 * | 7/2011 | Waldspurger | ......... G06F 12/023 717/124 |
| 8,065,714 B2 | 11/2011 | Budko | |

| | | |
|---|---|---|
| 8,117,314 B2 | 2/2012 | Croft |
| 8,788,803 B2 | 7/2014 | Irvine |
| 8,977,679 B2 | 3/2015 | Van Biljon |
| 9,628,448 B2 | 4/2017 | Hayton |
| 9,971,894 B2 | 5/2018 | Shear |
| 10,152,211 B2 | 12/2018 | Koushik |
| 10,257,205 B2 | 4/2019 | Mathew |
| 10,367,802 B2 | 7/2019 | Koushik |
| 10,402,301 B2 | 9/2019 | Qadri |
| 10,474,559 B2 | 11/2019 | Moorthi |
| 10,623,501 B2 | 4/2020 | Mathew |
| 10,666,643 B2 | 5/2020 | Mathew |
| 10,778,659 B2 | 9/2020 | Tola |
| 10,812,473 B2 | 10/2020 | Ramesh Kumar |
| 10,880,292 B2 | 12/2020 | Koottayi |
| 11,115,404 B2 | 9/2021 | Siefker |
| 11,159,528 B2 | 10/2021 | Siefker |

(Continued)

*Primary Examiner* — Michael M Lee

(74) *Attorney, Agent, or Firm* — Moore & Van Allen PLLC; Nicholas C. Russell

(57) ABSTRACT

A system is provided for validation and authentication of resources in a virtual environment. In particular, the system may embed a digital source identifier into a digital or virtual resource within the virtual environment. For instance, in some embodiments, the digital source identifier may be an image file that may be stored within one or more pre-defined areas or regions of the virtual resource, where the image file serves as an indicator of authenticity and validity of the virtual resource. Accordingly, the system may comprise a scanner that may be configured to scan the one or more pre-defined areas or regions to detect the presence of the digital source identifier. If the digital source identifier is found, the system may determine that the virtual resource has been validated and authenticated.

20 Claims, 4 Drawing Sheets

(56) References Cited

U.S. PATENT DOCUMENTS

| | | | |
|---|---|---|---|
| 11,190,609 B2 | 11/2021 | Siefker | |
| 11,303,627 B2 | 4/2022 | Maria | |
| 2016/0142418 A1* | 5/2016 | Barton | G06F 21/44 |
| | | | 726/4 |
| 2016/0241532 A1* | 8/2016 | Loughlin-Mchugh | |
| | | | H04W 12/068 |
| 2017/0041309 A1* | 2/2017 | Ekambaram | H04L 63/1483 |
| 2017/0208133 A1 | 7/2017 | Jorgensen | |
| 2017/0257886 A1 | 9/2017 | Adjakple | |
| 2018/0115551 A1 | 4/2018 | Cole | |
| 2019/0043023 A1* | 2/2019 | Kurian | G06Q 20/401 |
| 2019/0311168 A1* | 10/2019 | Decoux | G06F 21/44 |
| 2020/0104236 A1* | 4/2020 | Creel | G06F 16/2365 |
| 2020/0374113 A1 | 11/2020 | Noam | |
| 2021/0226796 A1* | 7/2021 | Ok | G06K 7/1417 |
| 2021/0326234 A1* | 10/2021 | Albero | G06F 11/3075 |
| 2021/0326455 A1* | 10/2021 | Albero | G06F 21/44 |
| 2022/0318371 A1* | 10/2022 | Slik | G06F 21/64 |
| 2022/0327178 A1* | 10/2022 | Roberts | G06T 1/0007 |

\* cited by examiner

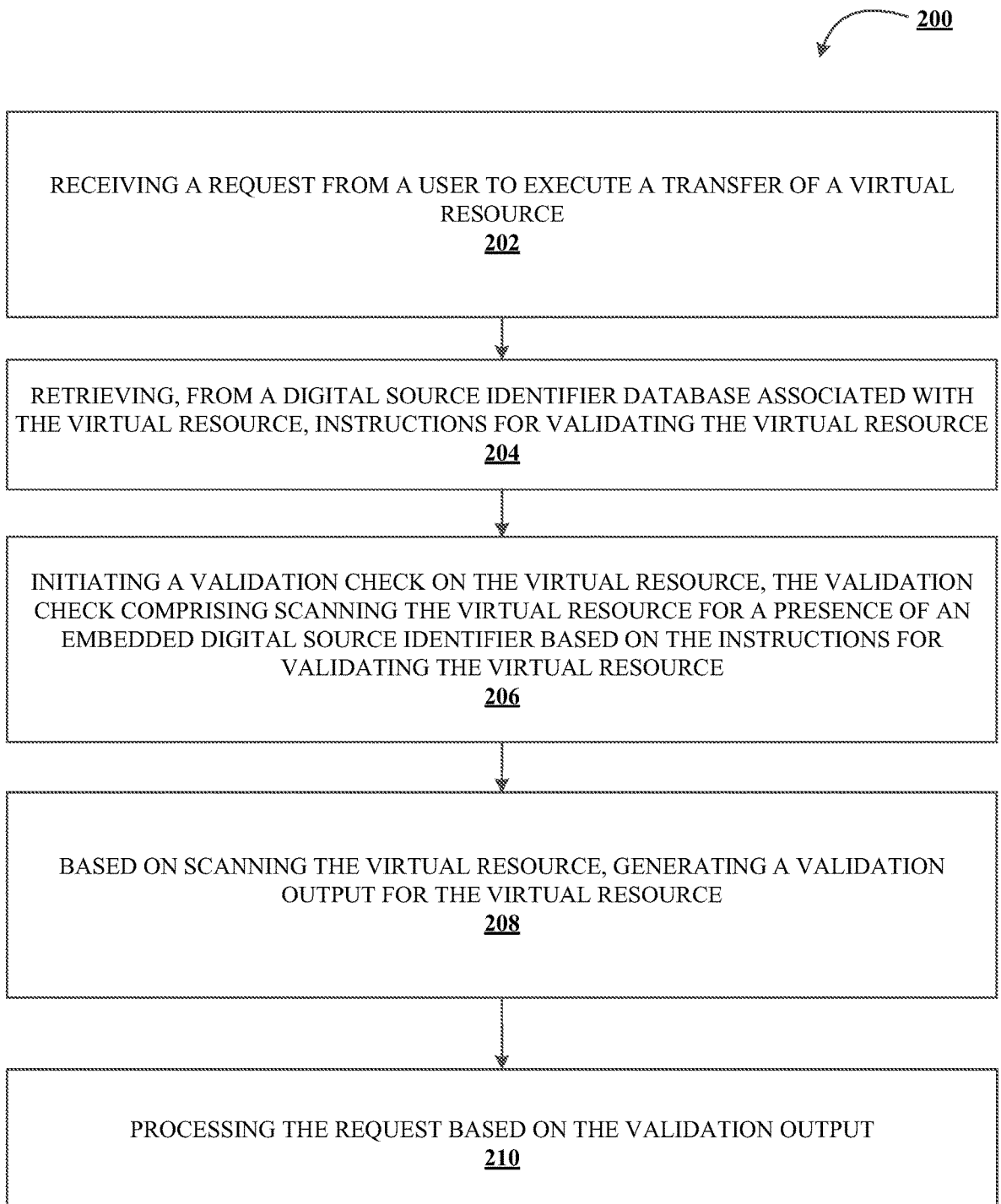

200

RECEIVING A REQUEST FROM A USER TO EXECUTE A TRANSFER OF A VIRTUAL RESOURCE
202

RETRIEVING, FROM A DIGITAL SOURCE IDENTIFIER DATABASE ASSOCIATED WITH THE VIRTUAL RESOURCE, INSTRUCTIONS FOR VALIDATING THE VIRTUAL RESOURCE
204

INITIATING A VALIDATION CHECK ON THE VIRTUAL RESOURCE, THE VALIDATION CHECK COMPRISING SCANNING THE VIRTUAL RESOURCE FOR A PRESENCE OF AN EMBEDDED DIGITAL SOURCE IDENTIFIER BASED ON THE INSTRUCTIONS FOR VALIDATING THE VIRTUAL RESOURCE
206

BASED ON SCANNING THE VIRTUAL RESOURCE, GENERATING A VALIDATION OUTPUT FOR THE VIRTUAL RESOURCE
208

PROCESSING THE REQUEST BASED ON THE VALIDATION OUTPUT
210

FIG. 2

SYSTEM FOR VALIDATION AND AUTHENTICATION OF RESOURCES IN A VIRTUAL ENVIRONMENT

TECHNOLOGICAL FIELD

Example embodiments of the present disclosure relate to validation and authentication of resources in a virtual environment.

BACKGROUND

There is a need for a way to validate the authenticity of virtual resources.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for validation and authentication of resources in a virtual environment. In particular, the system may embed a digital source identifier into a digital or virtual resource within the virtual environment. For instance, in some embodiments, the digital source identifier may be an image file that may be stored within one or more pre-defined areas or regions of the virtual resource, where the image file serves as an indicator of authenticity and validity of the virtual resource. Accordingly, the system may comprise a scanner that may be configured to scan the one or more pre-defined areas or regions to detect the presence of the digital source identifier. If the digital source identifier is found, the system may determine that the virtual resource has been validated and authenticated. However, if the digital source identifier is not found or is invalid, the system may automatically execute one or more remediation processes. In this way, the system provides an efficient and secure way to authenticate and validate resources in the virtual environment.

Accordingly, embodiments of the present disclosure provide a system for validation and authentication of resources in a virtual environment, the system comprising a processing device; a non-transitory storage device containing instructions when executed by the processing device, causes the processing device to perform the steps of receiving a request from a user to execute a transfer of a virtual resource; retrieving, from a digital source identifier database associated with the virtual resource, instructions for validating the virtual resource; initiating a validation check on the virtual resource, the validation check comprising scanning the virtual resource for a presence of an embedded digital source identifier based on the instructions for validating the virtual resource; based on scanning the virtual resource, generating a validation output for the virtual resource; and processing the request based on the validation output.

In some embodiments, generating the validation output comprises scanning a predefined location within the virtual resource based on the instructions for validating the resource; detecting a first digital source identifier within the predefined location; retrieving, from the digital source identifier database, a first digital source hash associated with the virtual resource; generating a first verification hash by inputting the first digital source identifier into a hash algorithm; detecting a match between the first verification hash with the first digital source hash; and determining that the virtual resource has passed the validation check.

In some embodiments, processing the request based on the validation output comprises executing the transfer of the virtual resource according to one or more parameters within the request from the user, the one or more parameters comprising at least one of a resource amount and a resource type.

In some embodiments, generating the validation output comprises scanning a predefined location within the virtual resource based on the instructions for validating the resource; detecting a first digital source identifier within the predefined location; retrieving, from the digital source identifier database, a first digital source hash associated with the virtual resource; generating a first verification hash by inputting the first digital source identifier into a hash algorithm; detecting a mismatch between the first verification hash with the first digital source hash; and determining that the virtual resource has failed the validation check.

In some embodiments, processing the request based on the validation output comprises executing one or more remediation processes, the one or more remediation processes comprising blocking the transfer of the virtual resource.

In some embodiments, the one or more remediation processes further comprises transmitting a notification to an entity computing system, the notification comprising an indication that the virtual resource has failed the validation check.

In some embodiments, the one or more remediation processes further comprises tagging the virtual resource to indicate that the virtual resource is non-genuine.

Embodiments of the present disclosure also provide a computer program product for validation and authentication of resources in a virtual environment, the computer program product comprising a non-transitory computer-readable medium comprising code causing an apparatus to perform the steps of receiving a request from a user to execute a transfer of a virtual resource; retrieving, from a digital source identifier database associated with the virtual resource, instructions for validating the virtual resource; initiating a validation check on the virtual resource, the validation check comprising scanning the virtual resource for a presence of an embedded digital source identifier based on the instructions for validating the virtual resource; based on scanning the virtual resource, generating a validation output for the virtual resource; and processing the request based on the validation output.

In some embodiments, generating the validation output comprises scanning a predefined location within the virtual resource based on the instructions for validating the resource; detecting a first digital source identifier within the predefined location; retrieving, from the digital source identifier database, a first digital source hash associated with the virtual resource; generating a first verification hash by inputting the first digital source identifier into a hash algorithm; detecting a match between the first verification hash with the first digital source hash; and determining that the virtual resource has passed the validation check.

In some embodiments, processing the request based on the validation output comprises executing the transfer of the virtual resource according to one or more parameters within the request from the user, the one or more parameters comprising at least one of a resource amount and a resource type.

In some embodiments, generating the validation output comprises scanning a predefined location within the virtual resource based on the instructions for validating the resource; detecting a first digital source identifier within the predefined location; retrieving, from the digital source identifier database, a first digital source hash associated with the virtual resource; generating a first verification hash by inputting the first digital source identifier into a hash algorithm; detecting a mismatch between the first verification hash with the first digital source hash; and determining that the virtual resource has failed the validation check.

In some embodiments, processing the request based on the validation output comprises executing one or more remediation processes, the one or more remediation processes comprising blocking the transfer of the virtual resource.

In some embodiments, the one or more remediation processes further comprises transmitting a notification to an entity computing system, the notification comprising an indication that the virtual resource has failed the validation check.

Embodiments of the present disclosure also provide a computer-implemented method for validation and authentication of resources in a virtual environment, the computer-implemented method comprising receiving a request from a user to execute a transfer of a virtual resource; retrieving, from a digital source identifier database associated with the virtual resource, instructions for validating the virtual resource; initiating a validation check on the virtual resource, the validation check comprising scanning the virtual resource for a presence of an embedded digital source identifier based on the instructions for validating the virtual resource; based on scanning the virtual resource, generating a validation output for the virtual resource; and processing the request based on the validation output.

In some embodiments, generating the validation output comprises scanning a predefined location within the virtual resource based on the instructions for validating the resource; detecting a first digital source identifier within the predefined location; retrieving, from the digital source identifier database, a first digital source hash associated with the virtual resource; generating a first verification hash by inputting the first digital source identifier into a hash algorithm; detecting a match between the first verification hash with the first digital source hash; and determining that the virtual resource has passed the validation check.

In some embodiments, processing the request based on the validation output comprises executing the transfer of the virtual resource according to one or more parameters within the request from the user, the one or more parameters comprising at least one of a resource amount and a resource type.

In some embodiments, generating the validation output comprises scanning a predefined location within the virtual resource based on the instructions for validating the resource; detecting a first digital source identifier within the predefined location; retrieving, from the digital source identifier database, a first digital source hash associated with the virtual resource; generating a first verification hash by inputting the first digital source identifier into a hash algorithm; detecting a mismatch between the first verification hash with the first digital source hash; and determining that the virtual resource has failed the validation check.

In some embodiments, processing the request based on the validation output comprises executing one or more remediation processes, the one or more remediation processes comprising blocking the transfer of the virtual resource.

In some embodiments, the one or more remediation processes further comprises transmitting a notification to an entity computing system, the notification comprising an indication that the virtual resource has failed the validation check.

In some embodiments, the one or more remediation processes further comprises tagging the virtual resource to indicate that the virtual resource is non-genuine.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
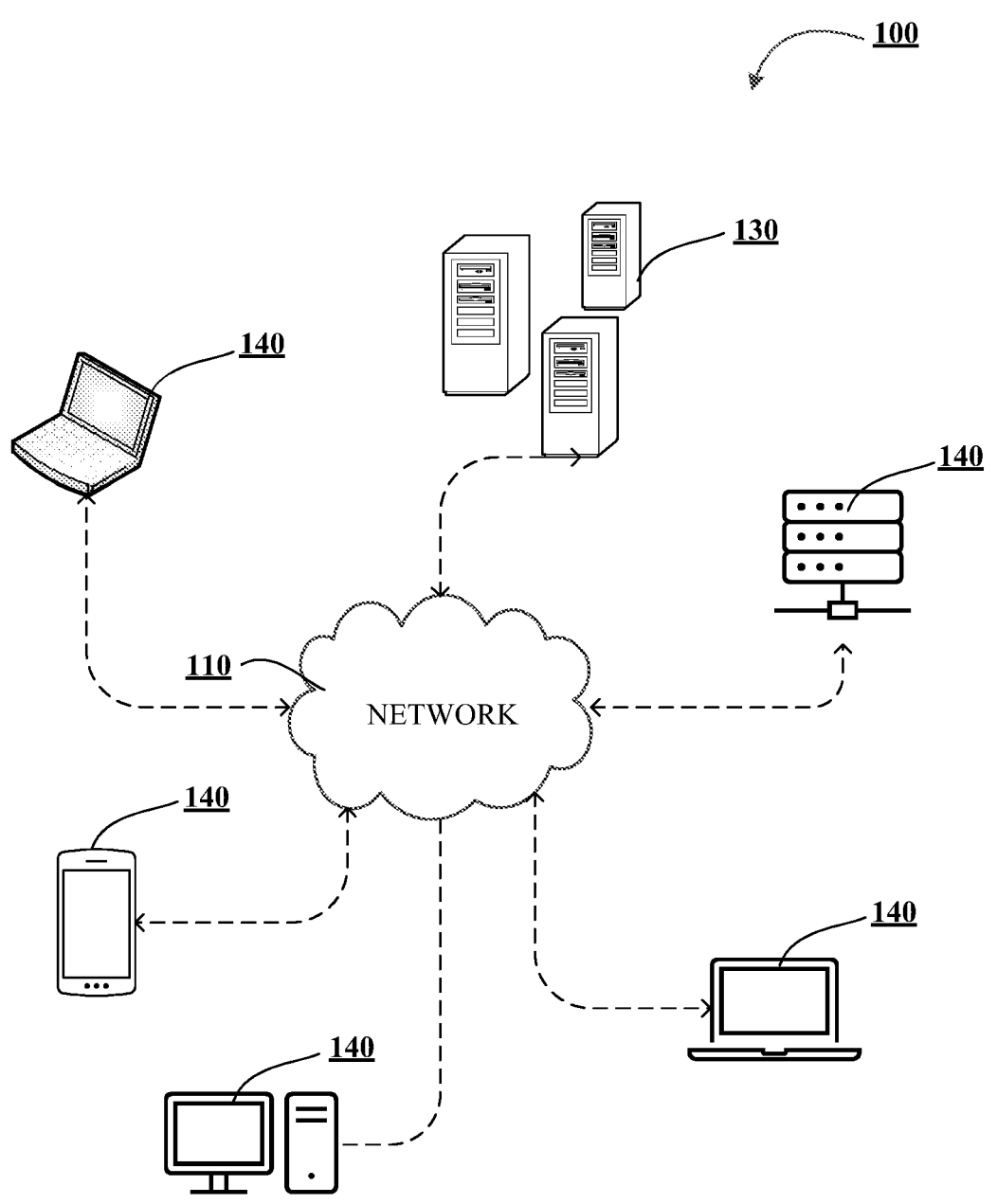
Figure 1B:
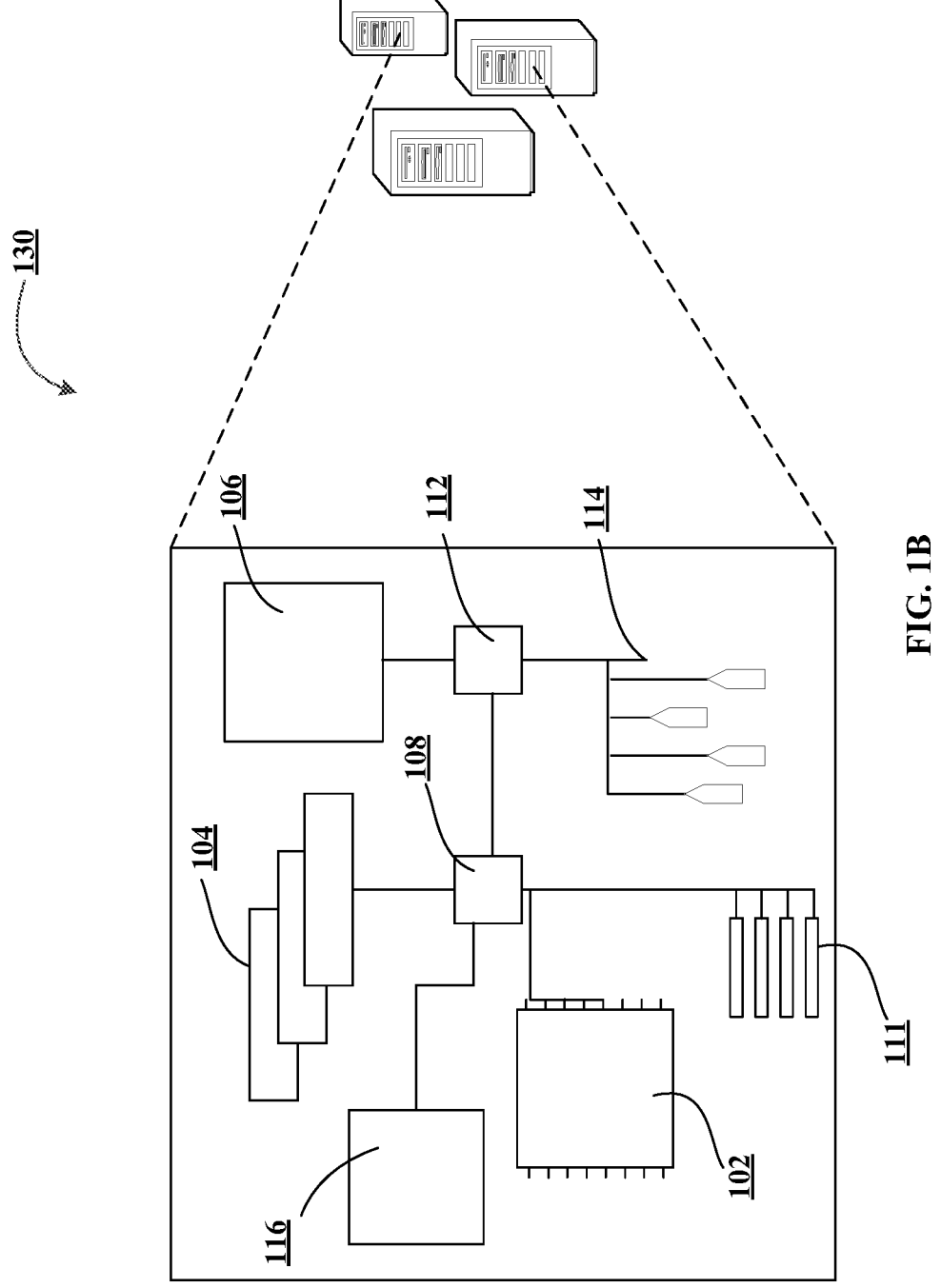
Figure 1C:
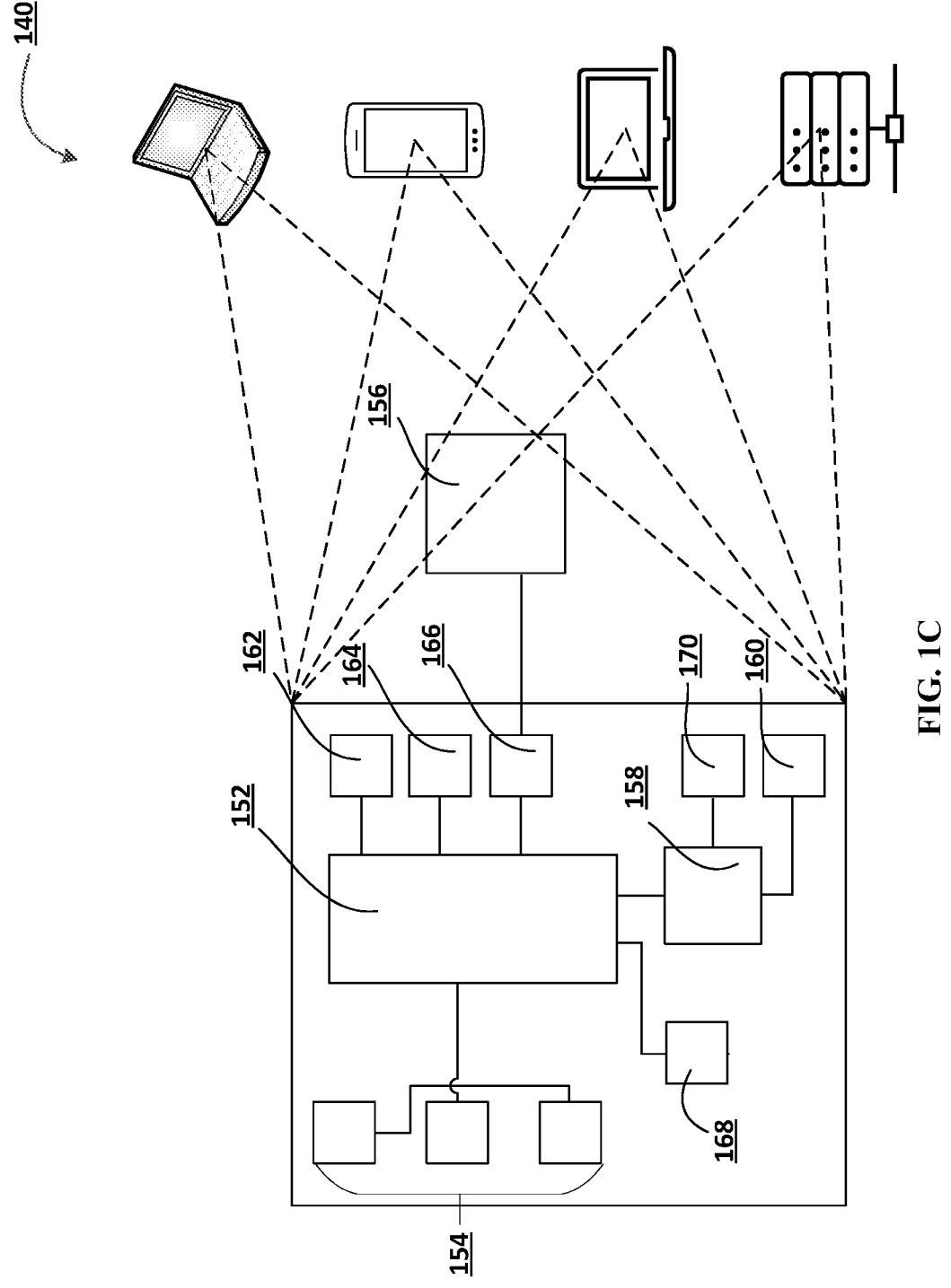

FIGS. 1A-1C illustrates technical components of an exemplary distributed computing environment for secure information transfer in a virtual environment, in accordance with an embodiment of the disclosure;

FIG. 2 illustrates a method for secure information transfer in a virtual environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Metaverse, as an evolving paradigm of the next generation Internet, aims to build a fully immersive, and self-sustaining virtual shared space for humans to play, work, and socialize. The metaverse integrates a variety of emerging technologies. The metaverse is the convergence of, (i) virtually enhanced physical reality, and (ii) physically persistent virtual space. It is a fusion of both, while allowing users to experience it as either. Accordingly, as used herein, "virtual environment" may refer to a metaverse environment.

Driven by recent advances in emerging technologies such as extended reality, artificial intelligence, and distributed ledger technology, metaverse is stepping from science fiction to an upcoming reality. However, security and privacy concerns (often inherited from underlying technologies or emerged in the new digital ecology) of metaverse can impede its wide deployment. For instance, a user may execute a transaction to purchase various types of virtual products and/or services (e.g., virtual or digital resources) within the virtual environment, where the virtual product or service may be associated with a visible identifier of the source or origin of the product or service (e.g., a logo, emblem, trademark, and/or the like). That said, there is a possibility that the virtual resource being purchased by the user may not be authentic (e.g., an unauthorized copy). Furthermore, the visible identifier associated with a particular product may undergo incremental revisions or evolve over time. Accordingly, there is a need for a way to efficiently and securely authenticate and validate digital resources.

To address the above concerns among others, the present disclosure provides a system for validation and authentication of resources in a virtual environment. The system may comprise a metaverse or virtual environment in which users may obtain virtual resources (e.g., through a transfer of resources, such as an exchange of an amount of virtual currency for a particular virtual product). The virtual resource may comprise a visible identifier that may signify the origin or source of the virtual resource (e.g., an image such as a logo of an entity or organization). The visible identifier may in turn comprise one or more embedded digital source identifiers that may be used to authenticate and validate the digital resource. In some embodiments, the embedded digital source identifier may include data such as an image, sound file, video file, text data, and/or the like, where the digital source identifier may be embedded into one or more specified pixels within the visible identifier of the virtual resource. In other embodiments, the digital source identifier may be embedded in a specific location on the virtual resource itself (e.g., if the virtual resource does not include a visible identifier).

The dimensions of the digital source identifier may be designated by the system to be invisible or undetectable by the human eye (e.g., the digital source identifiers are embedded ushing steganography). Accordingly, the user may not be able to perceive the presence of the digital source identifier. Once the digital source identifiers have been embedded into the virtual resource, the system may input the one or more digital source identifiers into a hash algorithm (e.g., SHA, MD5, and/or the like) to generate a digital source hash associated with the one or more digital source identifiers. The system may store each of the digital source hashes in a verified digital source identifier database. Each of the hashes within the digital source identifier database may be associated with and/or stored alongside metadata associated with the specific digital source identifier, where the metadata may include information such as in which pixels or locations of the visible identifier and/or virtual resource the digital source identifier is stored, the hash algorithm used to generate the digital source hash, a name or other identifier (e.g., serial number, hash value, and/or the like) associated with the entity that has created and/or endorsed the virtual resource, instructions for verifying the digital source identifiers (e.g., the specific inputs that the hash algorithm requires to perform the validation and authentication check), and/or the like. In this way, the digital source identifier database may serve as a trusted source for subsequent verifications of the digital source identifiers.

After the digital source identifier database has been generated and populated, the system may receive a selection of a virtual resource from a user (e.g., the user has selected a virtual product for purchase, such as a virtual item of clothing) along with a request to transfer the virtual resource. Upon receiving the selection from the user, the system may initiate a scan of the virtual resource. In this regard, the scan may include scanning and reading the visible identifier of the virtual resource and determining that the virtual resource is associated with a particular entity (e.g., the originator of the item of virtual clothing). In some embodiments, the system may use a machine learning-based process to perform image recognition of the visible identifier to identify the entity associated with the visible identifier. In other embodiments, the system may perform a full scan of all of the elements of the visible identifier to detect any embedded digital source identifiers. If any digital source identifiers are found, the system may log the locations in which the digital source identifiers are found, generate a verification hash of the digital source identifiers, and cross-reference the verification hashes and the locations of the digital source identifiers with the information found within the digital source database.

The system may then access the digital source identifier database and scan the designated locations of the visible identifier to determine whether the digital source identifiers are present. For example, if the visible identifier is a logo displayed using a 300 by 300 pixel matrix, the metadata within the digital source identifier database may indicate that a first digital source identifier should be located in row 13, column 79, and a second digital source identifier should be located in row 150, column 256, where the first digital source identifier is an image of an airplane, and the second digital source identifier is an image of a beach ball. If the system detects that both the first digital source identifier and the second digital source identifier are found in the visible identifier of the selected virtual resource, the system may generate a verification hash of the digital source identifiers according to the instructions received from the digital source identifier database. For instance, the instructions may include executable instructions that, when executed by the system, causes the system to append the raw data of the first digital source identifier to the raw data of the second digital identifier and input the appended data into the hash algorithm to generate the verification hash.

Once the verification hash has been generated, the system may compare the verification hash with the digital source hash stored within the digital source identifier database. If a match is detected, the system may determine that the virtual resource is authentic and valid, and subsequently execute the transfer of the virtual resource according to the parameters received in the request. However, if the system detects a mismatch or detects that the digital source identifier is missing, the system may initiate a remediation process including one or more automated actions, where the automated actions may include blocking the transfer of the virtual resource and transmitting a notification to the entity's system, where the notification indicates that a non-authentic virtual resource associated with the entity has been detected. In some embodiments, the actions may further include locking the virtual resource such that the virtual resource may not be interacted with or viewed by the user.

In some embodiments, the system may periodically (e.g., every hour, every day, and/or the like) update the one or more digital source identifiers associated with a particular virtual resource or visible identifier for security purposes. For instance, the system may change where the digital source identifiers are located within the visible identifier and/or virtual resource (e.g., the specified pixels of the visible identifier), the number of digital source identifiers, the type of digital source identifiers, and/or the like. Continuing the above example, the system may update the digital source identifier database to include a third digital source identifier (e.g., in row 200, column 88 of the logo), change the first digital source identifier from a plane to a bike, change the second digital source identifier to a text string, and/or the like. In this way, even if an unauthorized user is able to compromise the digital source identifiers at one point in time, the same digital source identifiers may be invalid at a subsequent point in time.

The system as described herein provides a number of technological benefits over conventional authentication systems. In particular, through the use of digital source identifiers, the system is able to provide to the user an efficient, expedient, and secure way to verify the authenticity and validity of virtual resources within the metaverse. Furthermore, by dynamically updating the parameters associated with the digital source identifiers, the system may minimize the possibility of unauthorized users being able to circumvent the authentication and validation process.

FIGS. 1A-1C illustrate technical components of an exemplary distributed computing environment 100 for the system for validation and authentication of resources in a virtual environment. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a method for secure information transfer in a virtual environment 200, in accordance with an embodiment of the disclosure. As shown in block 202, the method includes receiving a request from a user to execute a transfer of a virtual resource. The request may be, for instance, a request from the user to purchase the virtual resource (e.g., exchanging an amount of digital currency for a virtual item in the metaverse, such as an article of virtual clothing, a piece of virtual property, and/or the like). Before processing the user's request, the system may initiate a validation process to verify the authenticity of the virtual resource. In this way, the system may help prevent instances in which the user may unknowingly purchase non-genuine virtual products or services.

Next, as shown in block 204, the method includes retrieving, from a digital source identifier database associated with the virtual resource, instructions for validating the virtual resource. The digital source identifier database may comprise one or more entries related to various types of virtual resources tracked by the system. In this regard, virtual resources considered to be valid or authentic by the system may comprise one or more embedded digital source identifiers, which may include pieces of data such as image files, video files, character strings, hash values, and/or the like. In some embodiments, the one or more embedded digital source identifiers may be embedded within a specified location within the virtual resource (e.g., the logo that appears on a virtual product). For instance, the digital source identifier database may indicate that the virtual resource includes a digital source identifier embedded in a first pixel of a visible identifier on the virtual resource.

The digital source identifier database may also include a digital source hash associated with the virtual resource, where the digital source hash has been generated by inputting the digital source identifier found in the designated locations into a hash algorithm. Accordingly, in such embodiments, the digital source identifier database may further include instructions for validating the virtual resource, where the instructions cause the system to scan the virtual resource for the presence of the embedded digital source identifiers and/or validate the hashes of the scanned digital source identifiers using the digital source hash associated with the virtual resource.

Next, as shown in block 206, the method includes initiating a validation check on the virtual resource, the validation check comprising scanning the virtual resource for a presence of an embedded digital source identifier based on the instructions for validating the virtual resource. In particular, the method may include scanning the specified locations of the virtual resource according to the validation instructions (e.g., scanning the specified pixels of a visible identifier on the virtual resource). For example, the instructions for validating the virtual resource may include scanning a first pixel of the visible identifier for a first embedded digital source identifier and scanning a second pixel of the visible identifier for a second embedded digital source identifier. If one or more of the digital source identifiers is missing from the designated locations of the virtual resource, the system may determine that the virtual resource does not include the required embedded digital source identifiers.

If the system detects that all of the digital source identifiers are present in the designated locations, the system may proceed with the next steps of the validation check. Continuing the example, the method may further comprise generating a first verification hash by inputting the first embedded digital source identifier into a hash algorithm (where the specific hash algorithm may be designated by the instructions for validating the virtual resource), and generating a second verification hash by inputting the second embedded digital source identifier into the hash algorithm. The system may then access the digital source database and compare the first verification hash with a first digital source hash and the second verification hash with a second digital source hash.

Next, as shown in block 208, the method includes based on scanning the virtual resource, generating a validation output for the virtual resource. If the system determines that the virtual resource does not include the required embedded digital source identifiers (e.g., a required digital source identifier is missing from the locations designated in the instructions for validating the virtual resource), the validation output may comprise an indication that the virtual resource has failed the validation check.

Similarly, if the system performs the hash verifications of the one or more digital source identifiers and detects a mismatch between any of the verification hashes and their corresponding digital source hashes, the validation output may comprise an indication that the virtual resource hash failed the validation check. On the other hand, if the system detects that all of the verification hashes for each of the detected digital source identifiers match their corresponding digital source hashes, the validation output may indicate that the virtual resource has passed the validation check.

Next, as shown in block 210, the method includes processing the request based on the validation output. If the system determines, from the validation output, that the virtual resource has passed the validation check, then processing the request may include executing the transfer of the virtual resource according to the parameters defined in the request. The parameters may include the amount of resources to be exchanged for acquiring the virtual resource, the type of resources to be exchanged, a time at which the transfer will take place, resource account information, and/or the like.

However, if the system determines, from the validation output, that the virtual resource has failed the validation check, the system may initiate one or more remediation processes on the virtual resource. For instance, the one or more remediation processes may include blocking the transfer of the virtual resource and transmitting a notification to an entity, the notification comprising an indication that a transfer of the virtual resource was attempted and that the virtual resource has failed the validation check. In some embodiments, the system may further tag the virtual resource as being non-genuine, such that subsequent requests to transfer the virtual resource may automatically blocked without the need to execute the validation check. In this way, the system may provide an efficient method for validating the authenticity of virtual resources within the metaverse.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for validation and authentication of resources in a virtual environment, the system comprising:
   a processing device;
   a non-transitory storage device containing instructions when executed by the processing device, causes the processing device to perform steps of:
      receiving a request from a user to execute a transfer of a virtual resource;
      retrieving, from a digital source identifier database associated with the virtual resource, instructions for validating the virtual resource;
      scanning a visible identifier of the virtual resource based on the instructions for validating the virtual resource, wherein the visible identifier is displayed using a pixel matrix;

detecting a first digital source identifier and a second digital source identifier within the pixel matrix of the visible identifier, wherein a location of the first digital source identifier within the pixel matrix, a form of the first digital source identifier within the pixel matrix, a location of the second digital source identifier within the pixel matrix, and a form of the second digital source identifier are periodically updated;
      based on the instructions for validating the virtual resource, appending data of the first digital source identifier to data of the second digital source identifier to generate appended data;
      generating a verification hash by inputting the appended data into a hash algorithm;
      retrieving, from the digital source identifier database, a digital source hash associated with the virtual resource;
      generating a validation output for the virtual resource based on matching of the validation hash with the digital source hash; and
      processing the request based on the validation output.

2. The system of claim 1, wherein generating the validation output comprises:
   detecting a match between the verification hash with the digital source hash; and
   determining that the virtual resource has passed a validation check of the instructions for validating the virtual resource.

3. The system of claim 2, wherein processing the request based on the validation output comprises executing the transfer of the virtual resource according to one or more parameters within the request from the user, the one or more parameters comprising at least one of a resource amount and a resource type.

4. The system of claim 1, wherein generating the validation output comprises:
   detecting a mismatch between the verification hash with the digital source hash; and
   determining that the virtual resource has failed a validation check of the instructions for validating the virtual resource.

5. The system of claim 4, wherein processing the request based on the validation output comprises executing one or more remediation processes, the one or more remediation processes comprising blocking the transfer of the virtual resource.

6. The system of claim 1, wherein the non-transitory storage device contains instructions that, when executed by the processing device, causes the processing device to, prior to receiving the request, perform the steps of:
   embedding the first digital source identifier and the second digital source identifier into the visible identifier of the virtual resource;
   inputting the data of the first digital source identifier and the data of the second digital source identifier into a hash algorithm to generate the digital source hash; and
   storing the digital source hash in the digital source identifier database.

7. The system of claim 1, wherein the non-transitory storage device contains instructions that, when executed by the processing device, causes the processing device to perform the steps of, when periodically updating the first digital source identifier and the second digital source identifier:

inputting updated data of the first digital source identifier and updated data of the second digital source identifier into the hash algorithm to generate an updated digital source hash; and storing the updated digital source hash in the digital source identifier database.

8. A computer program product for validation and authentication of resources in a virtual environment, the computer program product comprising a non-transitory computer-readable medium comprising code causing an apparatus to perform steps of:

receiving a request from a user to execute a transfer of a virtual resource;

retrieving, from a digital source identifier database associated with the virtual resource, instructions for validating the virtual resource;

scanning a visible identifier of the virtual resource based on the instructions for validating the virtual resource, wherein the visible identifier is displayed using a pixel matrix;

detecting a first digital source identifier and a second digital source identifier within the pixel matrix of the visible identifier, wherein a location of the first digital source identifier within the pixel matrix, a form of the first digital source identifier within the pixel matrix, a location of the second digital source identifier within the pixel matrix, and a form of the second digital source identifier are periodically updated;

based on the instructions for validating the virtual resource, appending data of the first digital source identifier to data of the second digital source identifier to generate appended data;

generating a verification hash by inputting the appended data into a hash algorithm;

retrieving, from the digital source identifier database, a digital source hash associated with the virtual resource;

generating a validation output for the virtual resource based on matching of the validation hash with the digital source hash; and processing the request based on the validation output.

9. The computer program product of claim 8, wherein generating the validation output comprises:

detecting a match between the verification hash with the digital source hash; and determining that the virtual resource has passed a validation check of the instructions for validating the virtual resource.

10. The computer program product of claim 9, wherein processing the request based on the validation output comprises executing the transfer of the virtual resource according to one or more parameters within the request from the user, the one or more parameters comprising at least one of a resource amount and a resource type.

11. The computer program product of claim 8, wherein generating the validation output comprises:

detecting a mismatch between the verification hash with the digital source hash; and determining that the virtual resource has failed a validation check of the instructions for validating the virtual resource.

12. The computer program product of claim 11, wherein processing the request based on the validation output comprises executing one or more remediation processes, the one or more remediation processes comprising blocking the transfer of the virtual resource.

13. The computer program product of claim 8, wherein the non-transitory computer-readable medium comprises code that causes an apparatus to, prior to receiving the request, perform the steps of:

embedding the first digital source identifier and the second digital source identifier into the visible identifier of the virtual resource;

inputting the data of the first digital source identifier and the data of the second digital source identifier into a hash algorithm to generate the digital source hash; and storing the digital source hash in the digital source identifier database.

14. A computer-implemented method for validation and authentication of resources in a virtual environment, the computer-implemented method comprising:

receiving a request from a user to execute a transfer of a virtual resource;

retrieving, from a digital source identifier database associated with the virtual resource, instructions for validating the virtual resource;

scanning a visible identifier of the virtual resource based on the instructions for validating the virtual resource, wherein the visible identifier is displayed using a pixel matrix;

detecting a first digital source identifier and a second digital source identifier within the pixel matrix of the visible identifier, wherein a location of the first digital source identifier within the pixel matrix, a form of the first digital source identifier within the pixel matrix, a location of the second digital source identifier within the pixel matrix, and a form of the second digital source identifier are periodically updated;

based on the instructions for validating the virtual resource, appending data of the first digital source identifier to data of the second digital source identifier to generate appended data;

generating a verification hash by inputting the appended data into a hash algorithm;

retrieving, from the digital source identifier database, a digital source hash associated with the virtual resource;

generating a validation output for the virtual resource based on matching of the validation hash with the digital source hash; and processing the request based on the validation output.

15. The computer-implemented method of claim 14, wherein generating the validation output comprises:

detecting a match between the verification hash with the digital source hash; and determining that the virtual resource has passed a validation check of the instructions for validating the virtual resource.

16. The computer-implemented method of claim 15, wherein processing the request based on the validation output comprises executing the transfer of the virtual resource according to one or more parameters within the request from the user, the one or more parameters comprising at least one of a resource amount and a resource type.

17. The computer-implemented method of claim 14, wherein generating the validation output comprises:

detecting a mismatch between the verification hash with the digital source hash; and determining that the virtual resource has failed a validation check of the instructions for validating the virtual resource.

18. The computer-implemented method of claim 17, wherein processing the request based on the validation output comprises executing one or more remediation processes, the one or more remediation processes comprising blocking the transfer of the virtual resource.

19. The computer-implemented method of claim 14, the computer-implemented method further comprising, prior to receiving the request:

embedding the first digital source identifier and the second digital source identifier into the visible identifier of the virtual resource;

inputting the data of the first digital source identifier and the data of the second digital source identifier into a hash algorithm to generate the digital source hash; and storing the digital source hash in the digital source identifier database.

20. The computer-implemented method of claim 14, the computer-implemented method further comprising, when periodically updating the first digital source identifier and the second digital source identifier:

inputting updated data of the first digital source identifier and updated data of the second digital source identifier into the hash algorithm to generate an updated digital source hash; and storing the updated digital source hash in the digital source identifier database.

\*   \*   \*   \*   \*